May 6, 1969     IWAO OGURA     3,442,591
APPARATUS FOR MEASURING THE RAMAN EFFECT OF SAMPLES OF
INFINITESIMAL QUANTITIES
Filed March 3, 1966

3,442,591
APPARATUS FOR MEASURING THE RAMAN EFFECT OF SAMPLES OF INFINITESIMAL QUANTITIES
Iwao Ogura, Kodaira-shi, Tokyo-to, Japan, assignor to Kabushiki Kaisha Hitachi Seisakusho, Tokyo-to, Japan, a joint-stock company of Japan
Filed Mar. 3, 1966, Ser. No. 531,499
Claims priority, application Japan, Mar. 6, 1965, 40/12,979
Int. Cl. G01j 3/44
U.S. Cl. 356—75    2 Claims

ABSTRACT OF THE DISCLOSURE

Apparatus for measuring the Raman effect of samples of infinitesimal quantities in which a laser beam is focussed onto a sample to generate Raman light therefrom, and a reflecting system is positioned both to intercept the Raman light and direct it to a spectrometer and to reflect the laser beam back through the sample to the laser beam generator.

The reflecting system is constituted by two opposed concave mirrors, disposed on opposite sides of the sample and a concave mirror and a convex mirror arranged in that order between the sample and that concave mirror which is located on the side of the sample closer to the spectrometer.

---

This invention relates to apparatus capable of measuring the Raman spectrum (or Raman scattering) of samples of infinitesimal quantities.

Heretofore, the Raman effect of a substance has been measured by projecting exciting light from at least one light source onto a sample of the substance thereby to produce Raman light scattered from the sample and measuring this Raman light through a spectrometer from a direction perpendicular to the light path from the light source to the specimen.

Heretofore, however, only light sources such as mercury vapor lamps with feeble excitation have been available, and a large quantity of sample in each case has been necessary for observation. In order to condense the exciting light, of course, expedients such as the use of elliptical mirrors have been utilized, but the results have not been entirely satisfactory.

On one hand, however, the so-called laser light (or laser beam) has been developed in recent years and has been applied in various fields because of the excellence of its directionality and its monochromaticity.

It is an object of the present invention to overcome the above described difficulties in measuring the Raman effect by effectively and advantageously utilizing the characteristics of this laser light.

More specifically, an object of the invention is to provide an apparatus for measuring the Raman effect wherein the excellent directionality of laser light is particularly utilized to concentrate irradiation energy onto an infinitesimal region thereby to measure the Raman effect of samples of infinitesimal quantity.

According to the present invention, there is provided an apparatus for measuring the Raman effect which comprises means for generating and focusing a laser beam on a sample, a reflecting microscopic system comprising a transparent cell for holding the sample and mirrors, said system being positioned to intercept Raman light scattered from the sample upon irradiation thereof by the laser beam and to direct said Raman light so intercepted in one direction, and means to measure said Raman light so directed.

The details of the invention will be more clearly apparent from the following detailed description when taken in conjunction with the accompanying drawings.

Figure 1:
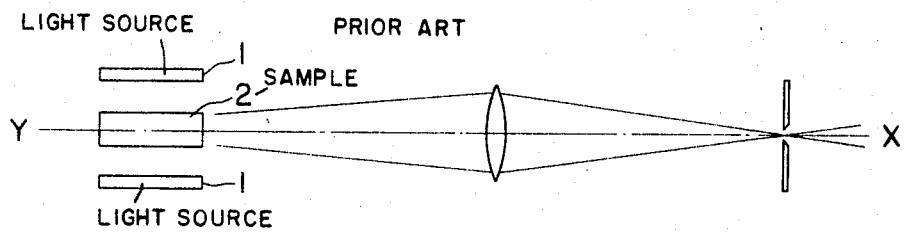

In the drawings:
FIG. 1 is a simplified diagram showing the essential parts of an apparatus of known type for measuring the Raman effect; and
FIG. 2 is a similar diagram showing the essential parts of a preferred embodiment according to the invention for measuring the Raman effect of samples of infinitesimal quantities.

Referring to FIG. 1, there is shown, for the purpose of comparison, an example of a conventional apparatus for measuring the Raman effect. In this apparatus, a sample 2 is irradiated with exciting light from light sources 1, and the resulting Raman light scattered from the sample 2 is measured in a spectrometer from a direction X or Y which is perpendicular to the light path from the light sources and the sample.

Figure 2:
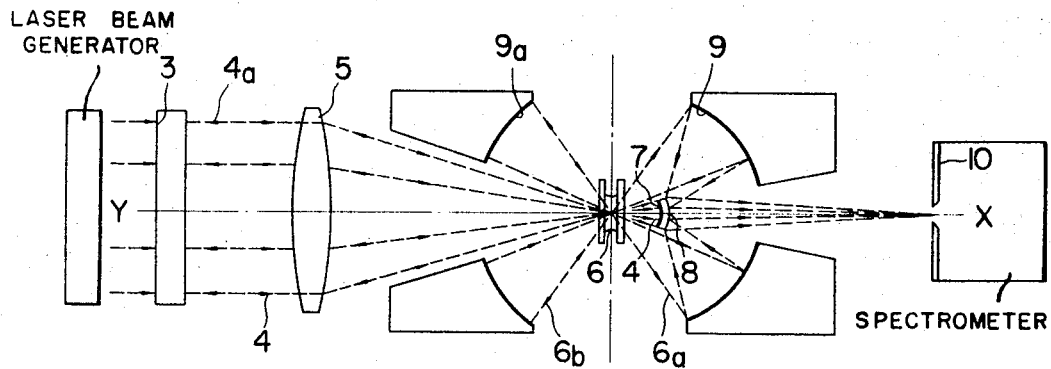

In the apparatus shown in FIG. 2 embodying the present invention, laser light 4 radiated from the beam transmitting mirror 3 (or front reflector, the laser beam radiating direction and the direction opposite thereto being herein referred to as the front or forward and the rear or rearward direction, respectively), of a laser mirror is directed by a focusing lens 5 to illuminate a sample within a transparent cell 6, whereupon Raman light is scattered from the sample.

The laser light 4 which has passed through the sample within the cell 6 is reflected by a small concave mirror 7, whose center of curvature is at the center of the cell 6, and, the light passes again through the sample within the cell, and is fed back to the mirror 3. Raman light is thus caused to scatter from the sample as this multiple reflection is repeated.

Raman light scattered in a diagonally forward direction as, for example, along path 6$_a$, is directed by a reflecting microscopic system consisting of a concave mirror 9 with a center of curvature at a point offset forwardly from the center of the cell 6 and a convex mirror 8 with a center of curvature at the center of the cell 6, to a slit 10 of a spectrometer disposed on the optical axis designated by line XY. The mirrors 7 and 8 may be formed as opposite surfaces of a spherical mirror whose radius of curvature is less than that of either mirrors 9, or 9$_a$. The radius of curvature of mirror 8 is greater than that of mirror 7 as shown in FIG. 2.

Raman light scattered in a diagonally rearward direction as, for example, along path 6$_b$, is reflected by a concave mirror 9$_a$ having a center of curvature at the center of the cell 6 and returned to the reflecting microscopic system, thereby being directed to the spectrometer in a manner similar to that of the Raman light scattered along the path 6$_a$. In this manner the Raman effect of the sample within the cell 6 is measured according to the present invention.

While the above described Raman effect measuring apparatus is incapable, of course, of intercepting the Raman scattered light radiated directly toward the slit of the spectrometer and the Raman light scattered perpendicularly to the optical axis XY, it will be apparent that the Raman effect obtained is of amply high magnitude in view of the very high intensity of the exciting laser beam and the capability of the apparatus to intercept effectively Raman light scattered rearwardly from the sample cell.

A further advantage of the present invention is that, while a considerable quantity (at least of the order of a number of thousands of cubic millimetres) of each sample has been necessary in known devices for measuring the Raman effect, the measuring apparatus of the present invention is fully capable of measuring the Raman effect of a sample of approximately 1 cubic millimetre which is of an order corresponding to the focused spot of the laser beam.

What I claim is:

1. An apparatus for measuring the Raman effect of samples of infinitesimal quantities comprising: means to generate a laser beam and focus the same at a focal point on an optical axis; a reflecting microscopic system comprising, in coaxial arrangement on said axis, a transparent cell for holding a sample in its center at said focal point, a first concave mirror having a central aperture for passage of light and disposed between said means and said cell with its center of curvature at the center of said cell, a second concave mirror having a central aperture for passage of light and disposed on the side of said cell opposite that of the first concave mirror, the center of curvature of said second concave mirror being offset from the center of said cell on the side thereof nearest said second concave mirror, and a spherical mirror with reflective front and rear surfaces having a radius of curvature less than that of either of the first and second concave mirrors and disposed, with its center of curvature at the center of said cell at a position between said cell and said second concave mirror, said reflecting microscopic system being positioned to intercept Raman light scattered from the sample upon irradiation thereof by said laser beam and to direct said Raman light so intercepted in one direction; and means to measure said Raman light so directed.

2. An apparatus for measuring the Raman effect of samples of infinitesimal quantities comprising: means to generate a laser beam and to focus the same at a focal point on an optical axis, a transparent sample cell for holding a sample in its center at said focal point whereby Raman light is scattered from the sample; a first concave mirror disposed between said means and said cell having a central aperture for passage of light and a center of curvature at the center of the sample cell for reflecting Raman light back through said sample; a second concave mirror disposed on the side of said cell opposite that of the first concave mirror having a central aperture for passage of light and a center of curvature at a position forwardly of the cell for reflecting Raman light received from the sample and from the first mirror; a third concave mirror interposed between the sample cell and the second concave mirror and having a center of curvature at the center of the sample cell, said third mirror having a smaller radius of curvature than that of the second mirror for reflecting rays of the laser beam passing through the sample back towards the means which generates the laser beam; and a fourth concave mirror interposed between the third concave mirror and the second concave mirror and having a center of curvature at the center of the sample cell, said fourth mirror having a radius of curvature which is smaller than the curvature of the second concave mirror and larger than the radius of curvature of the third mirror for reflecting in one direction Raman light received from the second mirror, and means for receiving and measuring the Raman light from said fourth mirror.

References Cited

UNITED STATES PATENTS 2,730,004    1/1956    Badger et al. _____ 88—14

OTHER REFERENCES

Porto et al.: "Ruby Optical Maser as a Raman Source," Journal of the Optical Society of America, vol. 52, No. 3, March 1962, pp. 251 and 252.

Bradbury et al.: "An Improved Double-Beam Infrared Microspectrometer," Applied Optics, vol. 5, No. 2, February 1966, pp. 235–240.

RONALD L. WIBERT, *Primary Examiner.*

F. L. EVANS, *Assistant Examiner.*

U.S. Cl. X.R.

350—199